(12) United States Patent
Rubin et al.

(10) Patent No.: US 7,774,765 B2
(45) Date of Patent: Aug. 10, 2010

(54) METHOD AND APPARATUS FOR MOVING AREA OPERATOR DEFINITION INSTRUCTION STATEMENTS WITHIN CONTROL FLOW STRUCTURES

(75) Inventors: Norman Rubin, Cambridge, MA (US); William L. Licea-Kane, Arlington, MA (US)

(73) Assignee: ATI Technologies Inc., Markham, Ontario (CA)

( * ) Notice: Subject to any disclaimer, the term of this patent is extended or adjusted under 35 U.S.C. 154(b) by 1221 days.

(21) Appl. No.: 11/348,746

(22) Filed: Feb. 7, 2006

(65) Prior Publication Data

US 2007/0180437 A1 Aug. 2, 2007

Related U.S. Application Data

(60) Provisional application No. 60/764,402, filed on Feb. 1, 2006.

(51) Int. Cl.
G06F 9/45 (2006.01)
G06T 15/50 (2006.01)

(52) U.S. Cl. .............. 717/144; 717/155; 717/156; 717/157; 717/159; 345/426

(58) Field of Classification Search .............. None
See application file for complete search history.

(56) References Cited

U.S. PATENT DOCUMENTS

| | | | | |
|---|---|---|---|---|
| 6,415,433 B1 * | 7/2002 | Callahan et al. | ............. | 717/160 |
| 7,281,122 B2 * | 10/2007 | Rubin et al. | ............. | 712/226 |
| 7,450,131 B2 * | 11/2008 | Swamy et al. | ............. | 345/565 |
| 2004/0237074 A1 * | 11/2004 | Aronson et al. | ............. | 717/158 |
| 2005/0154864 A1 * | 7/2005 | Rubin et al. | ............. | 712/226 |
| 2006/0034536 A1 * | 2/2006 | Ogren et al. | ............. | 382/254 |
| 2007/0216693 A1 * | 9/2007 | Gruber | ............. | 345/522 |

FOREIGN PATENT DOCUMENTS

WO   WO 2007125390 A2 * 11/2007

OTHER PUBLICATIONS

Gritz, L. et al., BMRT: A Global Illumination Implementation of the RenderMan Standard, Journal of Graphics Tools, vol. 1, No. 3 (1996) [Retrieved May 3, 2010], Retrieved from Internet <URL http://citeseerx.ist.psu.edu/viewdoc/download?doi=10.1.55.1891&rep=rep1&type=pdf>, pp. 1-8.*

(Continued)

*Primary Examiner*—Tuan Q Dam
*Assistant Examiner*—Todd Aguilera
(74) *Attorney, Agent, or Firm*—Vedder Price, P.C.

(57) ABSTRACT

A method and apparatus for use in compiling data for a program shader identifies within data representing control flow information an area operator definition instruction statement located outside the data dependent control flow structures. The method identifies within one of the data dependent branches at least one area operator use instruction statement that has the resultant of the area operator definition instruction statement as an operand. After identifying the area operator use instruction statement, the area operator definition instruction statement is placed within the data dependent branch.

23 Claims, 10 Drawing Sheets

OTHER PUBLICATIONS

International Preliminary Report on Patentability PCT/IB2007/000282, Aug. 12, 2007, pp. 1-6.*

International Search Report PCT/IB2007/000282, Nov. 2, 2008, pp. 1-2.*

Popa, T., Compiling Data Dependent Control Flow on SIMD GPUs, Thesis for the Degree of Master of Mathematics in Computer Science, 2004, University of Waterloo, Ontario, Canada, pp. i-88.*

Strzodka R., et al., Scientific computation for simulations on programmable graphics hardware, Simulation Modeling Practice and Theory, vol. 13. No. 8 (Nov. 2005), pp. 667-680.*

Cooper, K., "A Simple, Fast Dominance Algorithm," Software—Practice and Experience, vol. 4, 2001, John Wiley & Sons, Hoboken, N.J.

George, L., "Basic Compiler Graphs," Jan. 9, 2003, downloaded from the World Wide Web at www.cs.nyu.edu/leunga/www/MLRISC/Doc/html/compiler-graphs.html on May 1, 2006.

Gritz, L., "Advanced RenderMan: Beyond the Companion," Aug. 9, 1999, pp. 59-60, Pixar, N.P.

"Flow Control Limitations," MSDN Library, DirectX Graphics, Apr. 2006, downloaded from the World Wide Web at msdn.microsoft.com/library/en-us/directx9_c/texldd_ps.asp on May 1, 2006.

Kessenich, "The OpenGL Shading Language," 2004, pp. 58-59, 3Dlabs, Inc. Ltd., Madison, AL.

Brown, R, "NV_fragment_program2," May 16, 2004, NVIDIA Corp., downloaded from the World Wide Web at www.nvidia.com/dev_content/nvopenglspecs/GL_NV_fragment_program2.txt on May 1, 2006.

* cited by examiner

METHOD AND APPARATUS FOR MOVING AREA OPERATOR DEFINITION INSTRUCTION STATEMENTS WITHIN CONTROL FLOW STRUCTURES

CROSS-REFERENCE TO RELATED APPLICATION

This application claims priority to the provisional patent application having Application Number 60/764,402, filed Feb. 1, 2006, by Norman Rubin et al. and owned by instant assignee, for a Method and Apparatus for Moving Area Operator Definition Instruction Statements within Control Flow Structures.

FIELD OF THE INVENTION

The disclosure generally relates to computer methods and systems for executing programs using data dependent control flow structures, including those using SIMD (single instruction, multiple data) instructions such as shader programs, and more particularly, to such methods and systems for compiling data for efficient execution of such programs.

BACKGROUND OF THE INVENTION

Applications employing SIMD instructions, as the acronym suggests, have revolutionized the computing industry by providing an efficient way to simultaneously execute a single instruction on a large data set. Although SIMD instructions can be applied to almost any computing application, modern shader programs are one such example of an application employing SIMD instructions.

A shader program corresponds to object code data compatible with a specific graphics processor. The object code data is generated from data generally contained within an application module. In compiling the data, compilers generally create and maintain data representing control flow information for the shader program. The control flow information is an abstract representation of the program organized in blocks, each block containing one or more statements. The control flow information represents all possible alternatives of control flow (i.e., program flow) and is used to properly compile the data. Thus, the control flow information is representative of the shader program itself.

Shader programs are generally used by graphics processors to execute instruction statements across groups of pixels called grids. Conventionally, each grid may contain multiple pixels called neighbors. In the event that a grid contains four neighbors, the grid is termed a quad. Because modern shader programs are designed to operate on grids, each of the instructions in a shader program can be labeled a SIMD instruction. That is, a single SIMD instruction operates on each pixel in a grid, thus adding an important degree of efficiency to the shader program.

At the same time, shader programs often incorporate data dependent control flow structures each including one or more data dependent braches. Each data dependent branch includes a different path for the shader program to take based on a conditional statement. One example of a data dependent control flow structure is an "if/then/else" statement and all statements associated therewith. If the data meets a given condition in the "if" statement, the "then" data dependent branch is selected. If, however, the data fails the given condition in the "if" statement, then the "else" data dependent branch is selected. Shader programs, and programs in general that utilize data dependent control flow structures, execute faster because they do not compute all statements for all pixels in a grid. Thus, it is generally advantageous to place many instruction statements in data dependent control flow structures.

When a shader program reaches a data dependent control flow structure, one or more pixels in the grid may be forced to take one data dependent branch while the remaining pixels may be forced to take the alternate data dependent branch. Where pixels in a grid take alternate data dependent branches during execution of data dependent control flow structures, the processor needs to idle those pixels that do not take the first branch while executing the first branch of statements with respect to the remaining pixels. Upon completion of the first branch, the processor must then idle those pixels that took the first branch of statements while executing the second branch on the remaining pixels.

Shader programs also include instruction statements utilizing area operators, each acting as a function. The area operator function is defined in an area operator definition instruction statement. The area operator function is subsequently used in an area operator use instruction statement. For example an area operator definition instruction statement may resemble: $Y=f(X)$, where: $f(\ )$ is the area operator, X is a previously determined operand (sometimes called an index value) and Y is the resultant of the area operator definition instructions statement. One example of an area operator definition instruction statement is an area operator gradient operation typically performed in texture sampling where $f(X)$ may correspond to the gradient of X with respect to either the horizontal or vertical axis in screen space (x,y). The instruction statement that generates X may be labeled a source instruction statement because it defines a resultant, X, that is needed to compute the area operator definition instruction statement. An area operator use instruction statement may resemble: $Z=Y$, where: Y is the use of the resultant of the area operator definition instruction statement and an operand in the area operator use instruction statement and Z is the resultant of the area operator use instruction statement.

Area operator instruction statements, like other SI instructions, operate on each pixel in a grid. However, unlike ordinary SIMD instructions, area operator instruction statements are dependent upon data computed during the execution of at least one other pixel in the grid. That is, for each pixel in a given grid, the resultant of an area operator definition instruction statement is based on at least one source operand (i.e., X) of at least one of its neighbors. For instance, in the texture sampling example, the area operator definition instruction statement (i.e., the gradient of X with respect to the vertical or horizontal axis for one pixel in a grid) depends upon the value of X for at least one other pixel in the grid.

Because data dependent control flow structures essentially skip the execution of some instruction statements for some pixels in a grid, program developers who design and write the source code data for the shader programs cannot place area operator definition instruction statements within data dependent control flow structures. Area operator definition instruction statements are kept outside of data dependent control flow structures to insure that the area operator is defined for all data dependent paths associated with a data dependent control flow structure. Thus, developers can insure that every instance of an area operator use instruction statements will be executed properly (i.e., each area operator use instruction statement has known values for its operands).

Consequently, prior art shader programs (more specifically, the source code thereof) are written and executed in two parts. The first part places all area operator definition instruction statements outside data dependent control flow structures thus applying each area operator definition instruction statement to each pixel. A second part of the shader program makes use of the control flow information to discard the resultant data of the area operator definition instruction statement for those pixels that, according to the control flow information, will not require a use of the area operator definition instruction statement. Consequently, the application of each area operator definition instruction statement for each pixel and the subsequent discarding of resultant data is a drain on system resources, decreases efficiency and increases processing time.

The only know prior art alternatives to writing shade program sources in two parts requires program developers to split, if possible, statements containing an area operator definition instruction component and a non-area operator component. For example, a texture fetch statement may include an implicit area operator definition instruction component such as a texture sampling gradient operation (e.g., $Y=g(X, f(X))$) where g( ) represents the overall texture fetch statement while f( ) represents an implicit area operator definition instruction statement). In this case the overall statement could be split into its component parts. The first component, g( ), can be placed inside a data dependent control flow structure because the execution of g( ) does not depend upon a source instruction of one of its neighbors. The second component, f( ), however, must remain outside the data dependent control flow structure for the reasons articulated above.

While these solutions are more efficient than a shader program compiled with all area operator definition statements and their associated components located outside each data dependent control flow structure, each is plagued with possible or realized pitfalls. First, each alternative is only a partial solution to the identified problem. That is, while some statements are moved into the data dependent control flow structures, none of the area operator definition instruction statements themselves are incorporated therein. Thus, it is conceivable that the shader program cannot execute as efficiently without area operator definition instruction statements placed within data dependent control flow structures. The second problem arises from the significant amount of time required of a program developer to split statements incorporating implicit area operator definition instruction statements into component parts and to physically write the source code data such that a first component remains outside data dependent control flow instruction structures while a second component is placed inside data dependent control flow instruction structures. In order to prevent the possibility of computer bugs and errors, it is recognized that these solutions are time consuming, precarious and complex.

Thus, a need exists for an improved compiling scheme that overcomes one or more of the above drawbacks.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Figure 1:
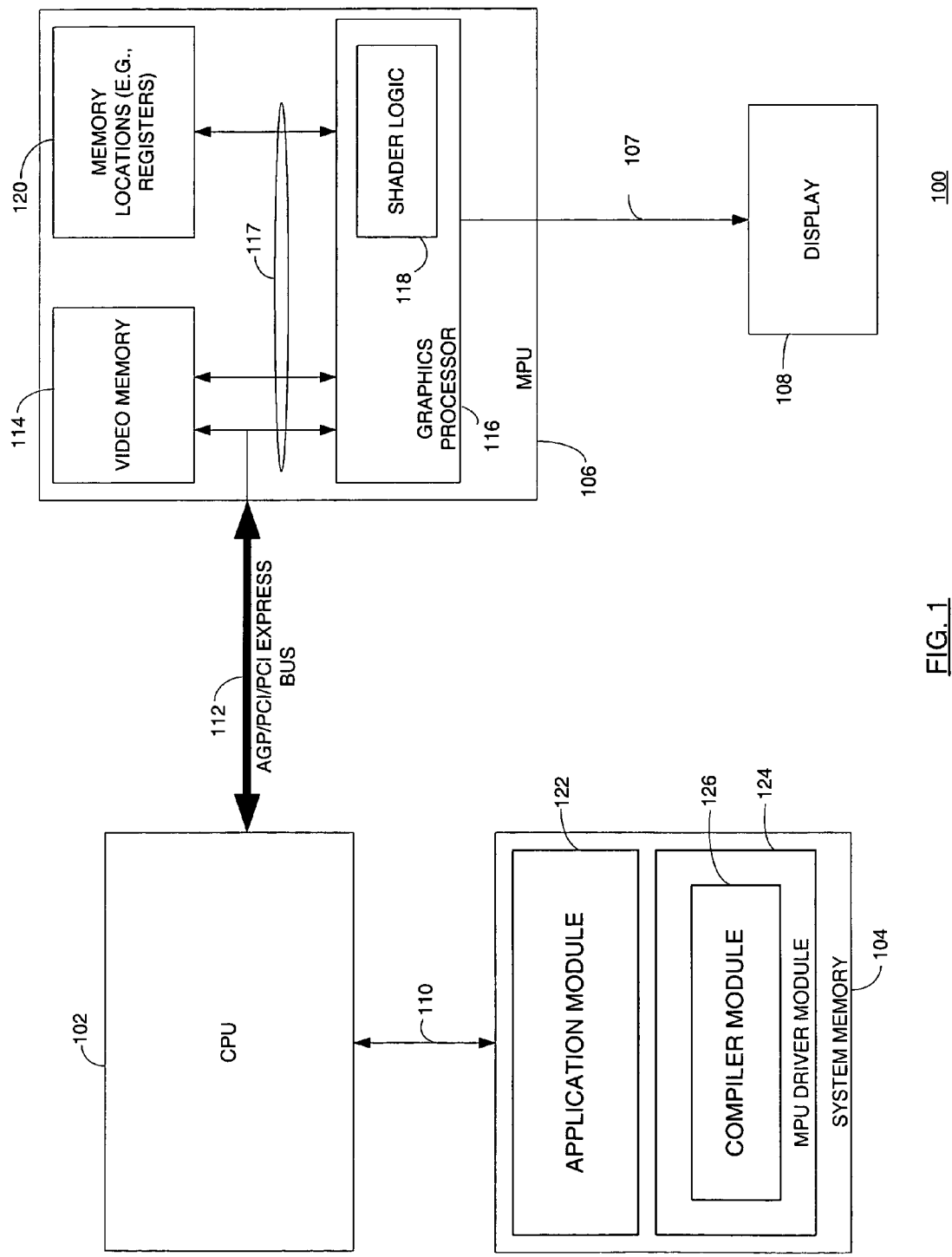
FIG. 1 is a block diagram illustrating one example of a computer system for compiling data into a shader program for execution on a graphics processor in accordance with one embodiment of the present invention.

In the following detailed description, numerous specific details are set forth in order to provide a thorough understanding of the present invention. It will be apparent to one of ordinary skill in the art, however, that these specific details need not be used to practice the present invention. In other instances, well-known structures, interfaces and processes have not been shown or described in detail in order not to unnecessarily obscure the present invention.

A method and apparatus for use in compiling data for a program shader identifies within data representing control flow information an area operator definition instruction statement. As contemplated, the data representing the control flow information includes blocks of statements and data dependent control flow structures each including data dependent branches, each branch including blocks of statements. The identified area operator definition instruction statement is located outside the data dependent control flow structures such that every pixel processed by the shader program would execute the area operator definition instruction statement. Because the area operator definition instruction statement contains a resultant and one or more operands the method identifies within one of the data dependent branches at least one area operator use instruction statement that has as an operand the resultant of the area operator definition instruction statement. After identifying the area operator use instruction statement, the area operator definition instruction statement is placed within the data dependent branch.

In one embodiment, a source instruction block is added to the data dependent branch to store data representing at least one of a source instruction statement or a symbolic memory location statement allocated to store the resultant of the at source instruction statement. The source instruction statement has a resultant that is needed, directly or indirectly, as an operand for the area operator definition instruction statement.

In another embodiment, at least one mirror block is added to the data representing the control flow information such that the area operator definition instruction may be properly executed for grids of pixels having at least one pixel that does not execute the area operator use instruction statement. The mirror block contains data representing the same data stored within the source instruction block.

In another embodiment, live memory location information is determined for every block in the data representing control flow information such that no data is inadvertently written over due to limited memory location resources. After modifying the data representing the control flow information, the data representing the control flow information is translated into data representing a shader program wherein each instruction statement contained in the source instruction statement is marked to execute for each pixel in a grid whenever at least one pixel in the grid executes the area operator definition instruction statement.

The present disclosure can be more fully described with reference to FIGS. 1-10. FIG. 1 is a block diagram illustrating one example of a computer system 100 for compiling into a shader program for execution on a graphics processor in accordance with one embodiment of the present invention. Computer system 100 includes a CPU 102, system memory 104, a multimedia processing unit ("MPU") 106 and an associated display 108. The CPU 102 is coupled, directly or indirectly, to system memory 104 using any suitable communication link or links 110. Similarly, CPU 102 is coupled, directly or indirectly, to MPU 106 by bus 112. In one embodiment, bus 112 may correspond to one of an AGP bus, PCI bus or PCI Express bus. Among other things, MPU 106 includes video memory 114, a graphics processor 116 and a plurality of memory locations (e.g., registers) 120. As illustrated, shader logic 118 may be included within graphics processor 116. A plurality of suitable communication links 117 may be utilized to couple, directly or indirectly, the components of MPU 106.

In one embodiment, system memory 104 may include an application module 122 and a MPU driver module 124 which includes at least compiler module 126. Each of the application module 122, the MPU driver module 124 and compiler module 126 include digital data to be processed by at least one of the CPU 102 and the graphics processor 116. For example, application module 122 represents the stored digital data that, when processed by CPU 102, performs the function of a given application. In one embodiment, the application module 122 includes the stored digital data to be compiled into a shader program corresponding to the application and for subsequent execution by the graphics processor 116 or any other suitable processor. Similarly, the MPU driver module 124 and more, specifically, the compiler module 126 represent the stored digital data that, when processed by the CPU 102, performs the functions of a compiler for use in generating the shader program for MPU 106.

In one embodiment, system 100 and its individual components may be disposed in any suitable device. For instance, system 100 and its individual components may be manufactured with or composed of one or more integrated circuits (ICs), discrete logic devices, state machines, application specific integrated circuits (ASICs), or any other suitable programmable or non-programmable structure or structures. In one embodiment, shader logic 118 may be implemented as a programmable shader in a processor, e.g., the graphics processor 116. The CPU 102 and graphics processor 116 may include at least one processing device such as, but not limited to, any suitable distributed or non-distributed processing or microprocessing device. System memory 104 and video memory 114 may be any suitable memory, such as by not limited to volatile and non-volatile memory, random access memory (including e.g., RAM, DRAM, SRAM), ROM-based memory (including e.g., ROM, PROM, EPROM, EEPROM) and flash memory. Lastly, display 108 may correspond to any suitable display such as, for example, a CRT or LCD.

As known in the art of graphics processing, the MPU 106, and more specifically, the video memory 114, receives a plurality of instructions and information from the CPU 102 such that the MPU 106 may perform, among other things, shading operations or other operations to produce pixels for display. In one example, shading operations correspond to texture fetching, texture mapping, shadow mapping and other operations that are responsible for the final surface characteristics of rendered pixels. A compiled shader program is provided to the MPU 106 by the CPU 102 in order to perform the plurality of shader operations. In one embodiment, the shader program is stored in video memory 114 and accessed by the graphics processor 116 in order to direct the operation of the shader logic 118 and memory locations 120 in carrying out the shading operations. Upon completion, the rendered pixel data is sent to display 108 via any suitable communication link 107 for subsequent display to a user.

The shader program may correspond to object code data compiled from a suitable source of data. In one embodiment, as illustrated above, the data is contained within the application module 122 stored in system memory 104. As recognized in the art and referenced above, the CPU 102, when executing compiler module 124 (collectively, "the compiler") creates and maintains digital data representing control flow information of the shader program where the control flow information is representative of the program itself and is organized in blocks. During compilation, the compiler is operative to optimize the shader program by modifying the blocks and the statements contained therein.

Figure 2:
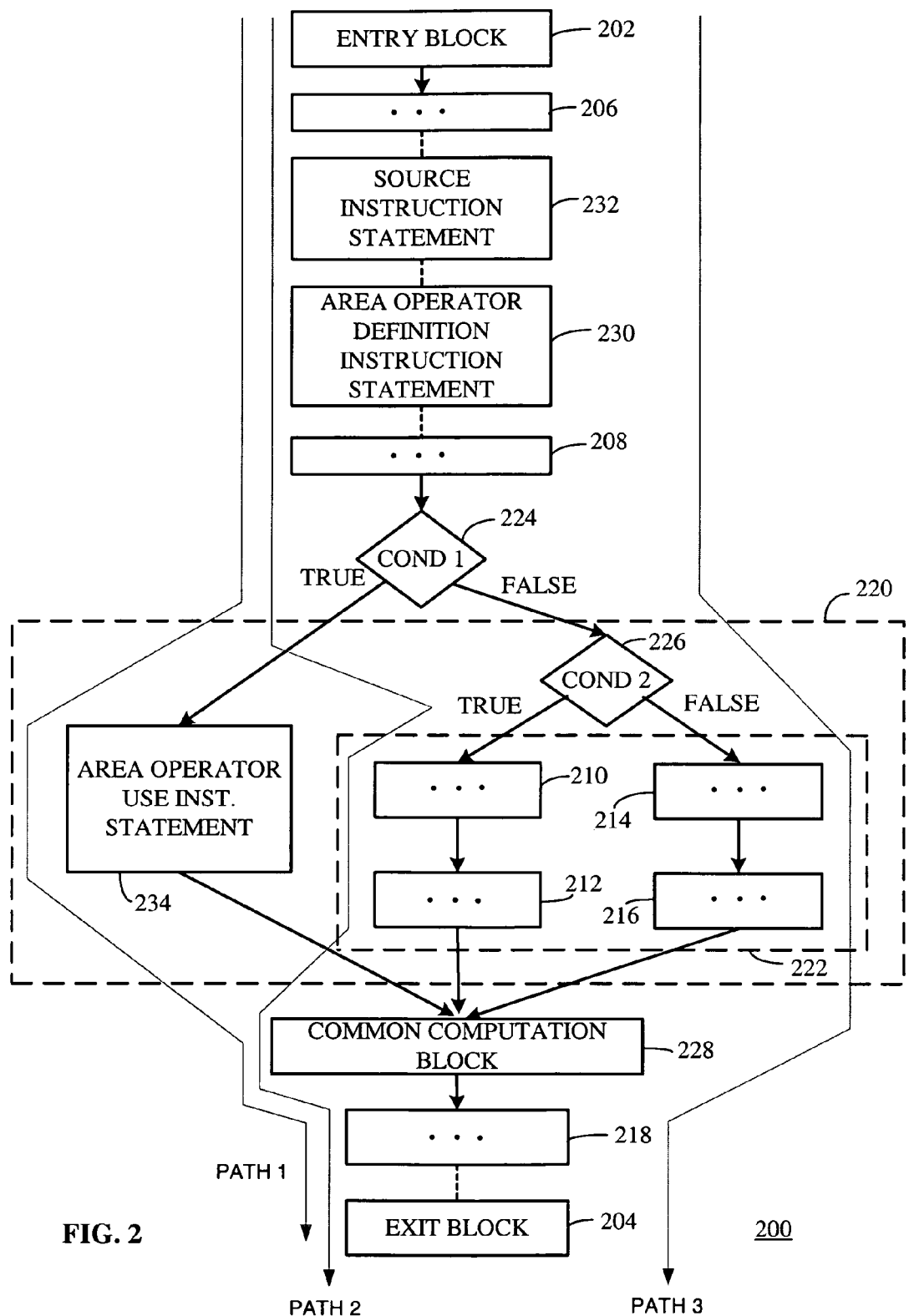
FIG. 2 is a block diagram illustrating one example of a graph representing control flow information for use in a compiler in accordance with one embodiment of the prior art.

FIG. 2 is a block diagram illustrating one example of a graph 200 representing control flow information for use in a compiler (e.g., the CPU 102 executing the compiler module 126) in accordance with one embodiment of the prior art. The graph 200 of FIG. 2 also represents an example of control flow information for a shader program prior to being modified using the methods described below. As illustrated, the control flow information consists of a plurality of blocks of statements. A statement may correspond to an instruction statement where the statement is instructing the executing processor (e.g., the graphics processor 116) to perform a task. Alternatively, a statement may correspond to other statements such as, e.g., metadata statements, that provide, for example, the context and other miscellaneous data in which the shader program may be properly executed. The control flow information consists of an entry block 202 and an exit block 204 through which all control flow, respectively, enters and exits the graph 200. That is, the entry block 202 is the start of the shader program while the exit block 204 is the finish of the shader program.

The exemplary control flow information includes a plurality of non-area operator-based instructions such as blocks 206-218 which may contain any number of statements. Additionally, graph 200 includes two data dependent control flow structures 220 and 222 each including one or more data dependent branches that may not be executed for a given pixel in a grid. That is, each data dependent control flow structure 220 and 222 represents blocks, a portion of which, may be skipped for any given pixel based on the condition statements contained in decisional blocks 224 and 226. Control flow information also includes a common computation block 228 that is common to each of the three data dependent branches associated with the two data dependent control flow structures 220 and 222 illustrated in graph 200 (i.e., all pixels will execute any instructions contained therein). In the example provided, an area operator definition instruction statement is located in block 230, outside data dependent control flow structures 220 and 222. As would be expected, its source instruction statement precedes the area operator definition instruction statement in block 232 such that the area operator definition instruction statement may be processed. Finally, an area operator use instruction statement is contained within block 234 located within one data dependent branch of a data dependent control flow structure 220.

Figure 3:
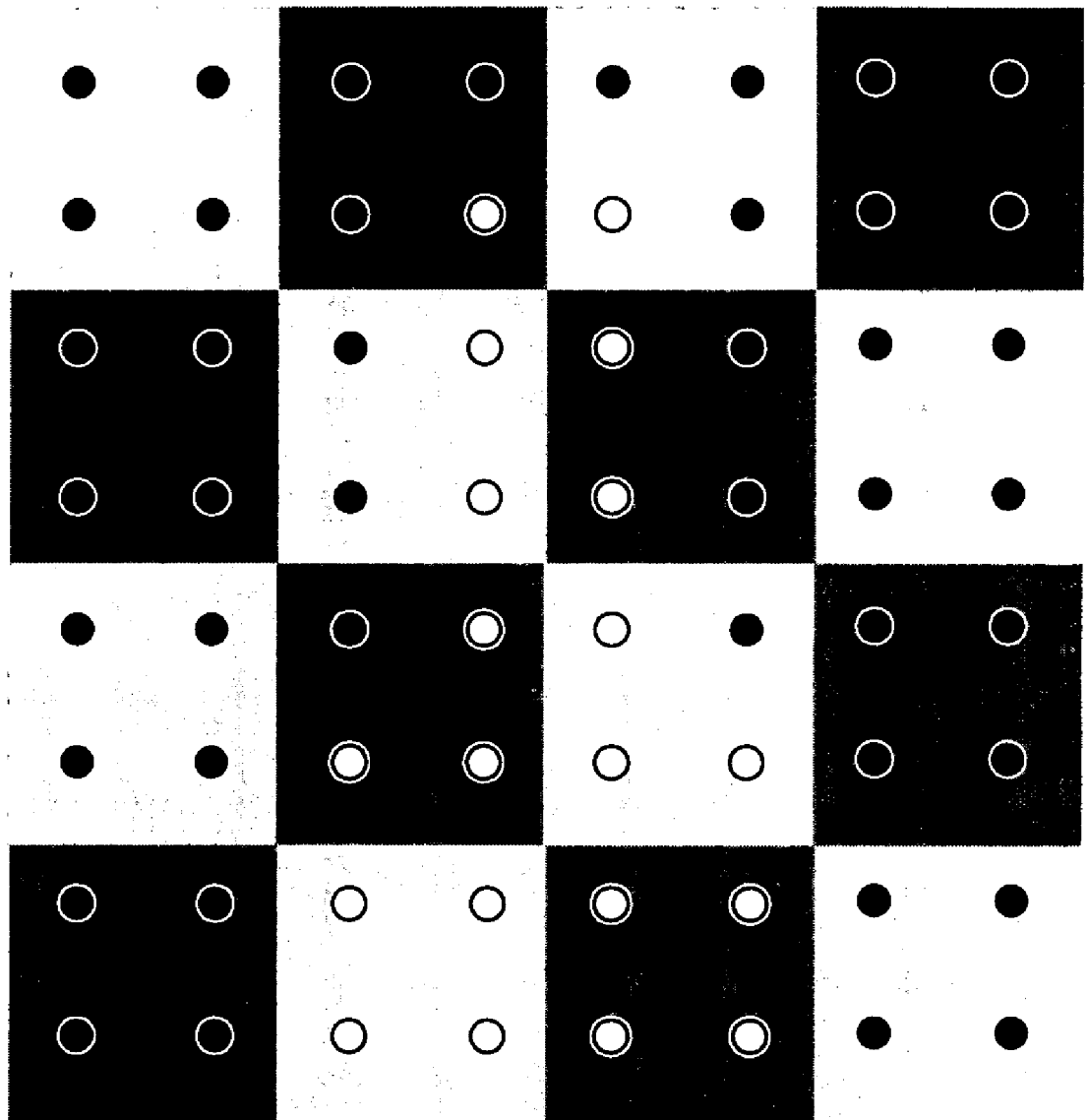
FIG. 3 is a block diagram of a plurality of pixels organized in quads associated with an exemplary data dependent control flow structure where the color of each pixel represents the result of a conditional statement in the exemplary data dependent control flow structure.

FIG. 3 is a block diagram of a plurality of pixels 300 organized in quads where the color of each pixel represents the result of a conditional statement associated with an exemplary data dependent control flow structure associated with control flow information. For purposes of illustration, the plurality of pixels 300 in FIG. 3 may be executed on a quad basis according to graph 200 of FIG. 2 where the color of each pixel as illustrated in FIG. 2 represents which branch the pixel took after execution of the conditional statement contained in decisional block 224. As illustrated, each darkened pixel represents a "false" result while each white pixel represents a "true" result.

As illustrated in graph 200, only those pixels that pass the test (i.e., receive a "true" in response to execution of the condition statement in block 224) execute the area operator use instruction statement in block 234. Ideally, the shader program would move the source instruction statement and area operator definition instruction statement from blocks 232 and 230 into the data dependent branch containing the area operator use instruction statement (block 234). However, as provided above, no prior art technique provides a method in which the above-mentioned blocks could be relocated within the data dependent control flow structure to allow those quads having at least one white pixel and at least one black pixel to similarly execute the necessary instructions for its neighbors while not writing over necessary data. Thus, prior art methods left the source instruction statement and area operator definition instruction statement outside the data dependent control flow structures 220 and 222, thereby forcing each pixel in the plurality of pixels 300 to execute the statements.

Prior to describing the methods of FIGS. 4-8, it is recognized that each of the method blocks contained therein and described below may be implemented using system 100, and more specifically, the CPU 102 executing the compiler module 126.

Figure 4:
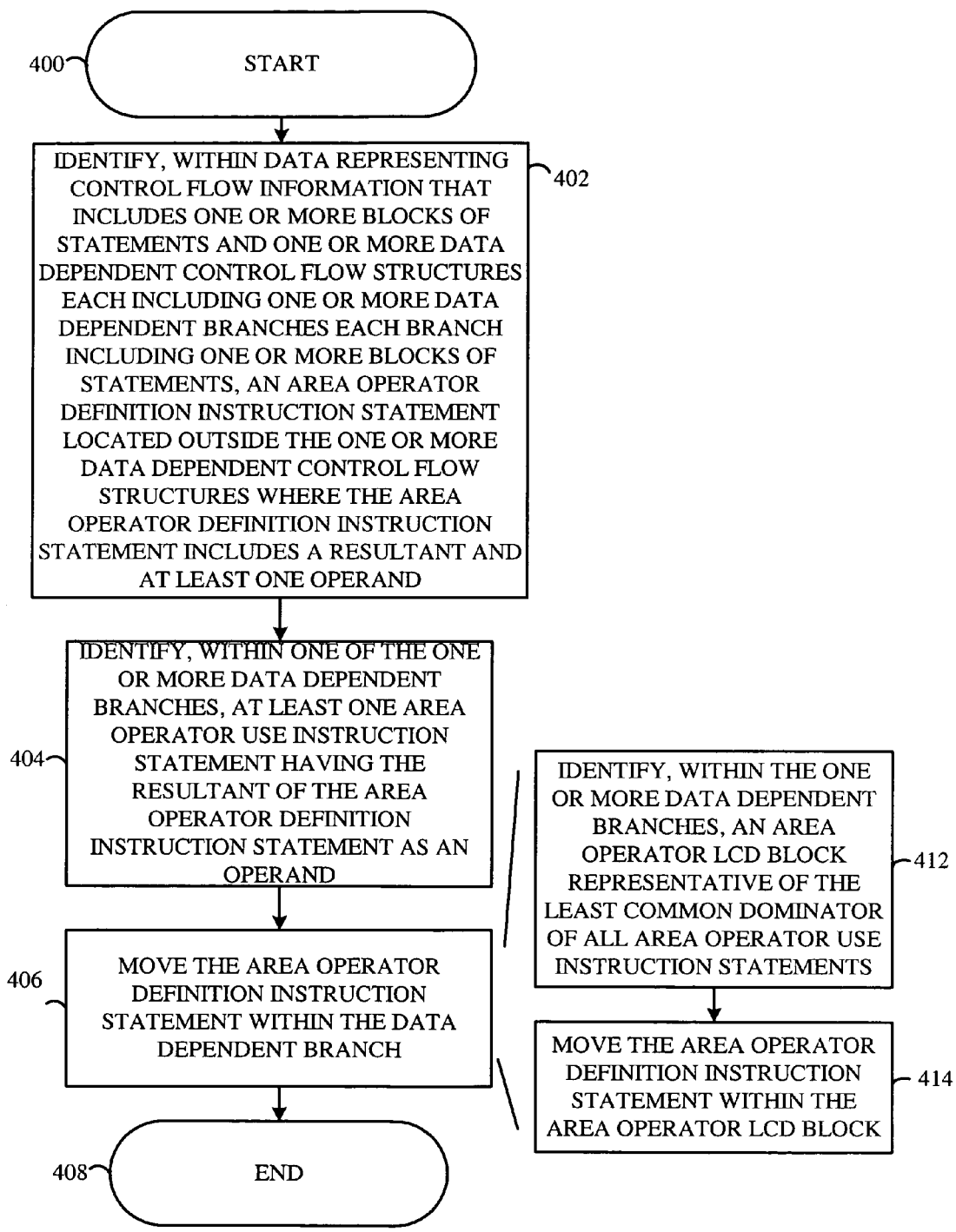
FIG. 4 is a flow chart illustrating one example of a method for moving an area operator definition instruction statement within a data dependent branch in accordance with one embodiment of the present disclosure.

FIG. 4 is a flow chart illustrating one example of a method for moving an area operator definition instruction statement within a data dependent branch in accordance with one embodiment of the present disclosure. The method begins in block 400, where e.g., data representing the control flow information is generated based on the stored digital data (e.g., stored in memory as part of application module 122) to be compiled into a shader program. The control flow information includes one or more blocks of statements and one or more data dependent control flow structures each including one or more data dependent branches, each branch including one or more blocks of statements. The method continues in block 402 by identifying, within data representing the control flow information, an area operator definition instruction statement located outside each data dependent control flow structure where the area operator definition instruction statement includes a resultant and at least one operand. In one embodiment, this corresponds to identifying block 230 in graph 200.

The method proceeds in block 404 where at least one area operator use instruction statement having the resultant of the area operator definition instruction statement as an operand is identified within one of the one or more data dependent branches of the control flow information. For purposes of example, this may correspond in one embodiment to identifying block 234 containing the area operator use instruction statement associated with the area operator definition instruction statement contained in block 230. Next, the method includes moving the area operator definition instruction statement within the data dependent branch as illustrated in block 406. In one embodiment, this corresponds to identifying an area operator least common dominator ("LCD") block representative of the least common dominator of all area operator use instructions in the control flow information and moving the area operator definition instruction statement within the area operator LCD block as provided in blocks 412-414. As will be recognized by one having ordinary skill in the art, the LCD block of all area operator use instructions in the control flow information is the block where, if the area operator definition instruction statement were moved to this block, the area operator definition instruction statement would be executed the least amount of times but would still be computed before any area operator use instruction statement. The method illustrated in blocks 400-414 may be implemented by the CPU 102 executing the compiler module 124.

Figure 9:
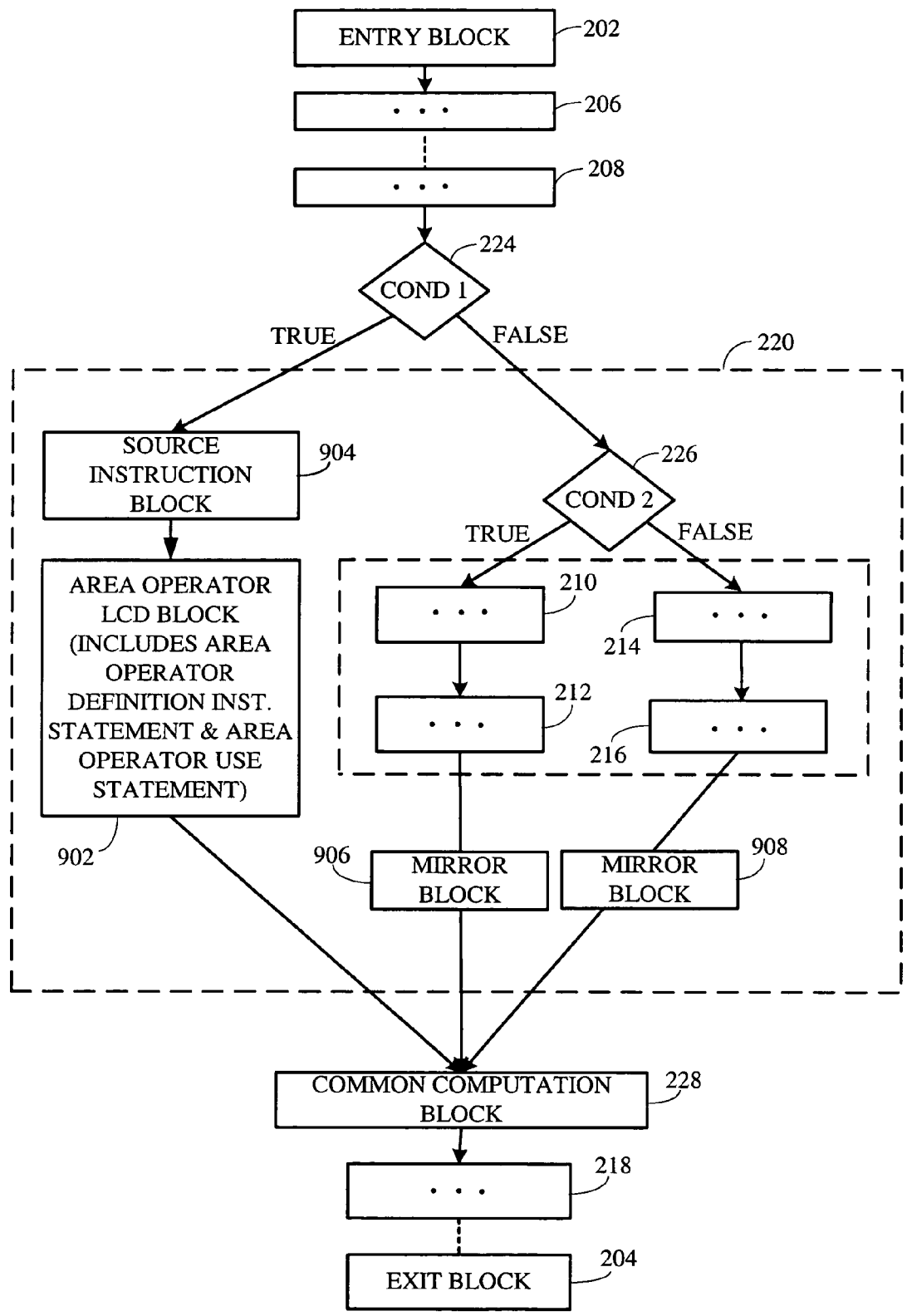
FIG. 9 is a block diagram illustrating one example of a graph representing control flow information as modified by a compiler using the methods of FIGS. 4-7 in accordance with one embodiment of the present disclosure.

While referencing FIG. 2, FIG. 9 is a block diagram illustrating one example of a graph representing the control flow information of FIG. 2 as modified by the compiler (e.g., the CPU 102 executing the compiler module 126) using the methods of FIGS. 4-7 in accordance with one embodiment of the present disclosure. Thus, the methods of blocks 412 and 414 may, in one embodiment, correspond to identifying block 234 of FIG. 2 as the area operator LCD block such that the area operator definition instruction statement originally contained in block 230 is moved within the area operator LCD block 234 as illustrated by block 902 in FIG. 9. As further illustrated in FIG. 9, this may correspond to deleting the block 230 if no other instruction statements are contained therein. The method of FIG. 4 ends in block 408, where e.g., further optimizations are performed on the data representing the control flow information before it is compiled into a shader program.

Figure 5:
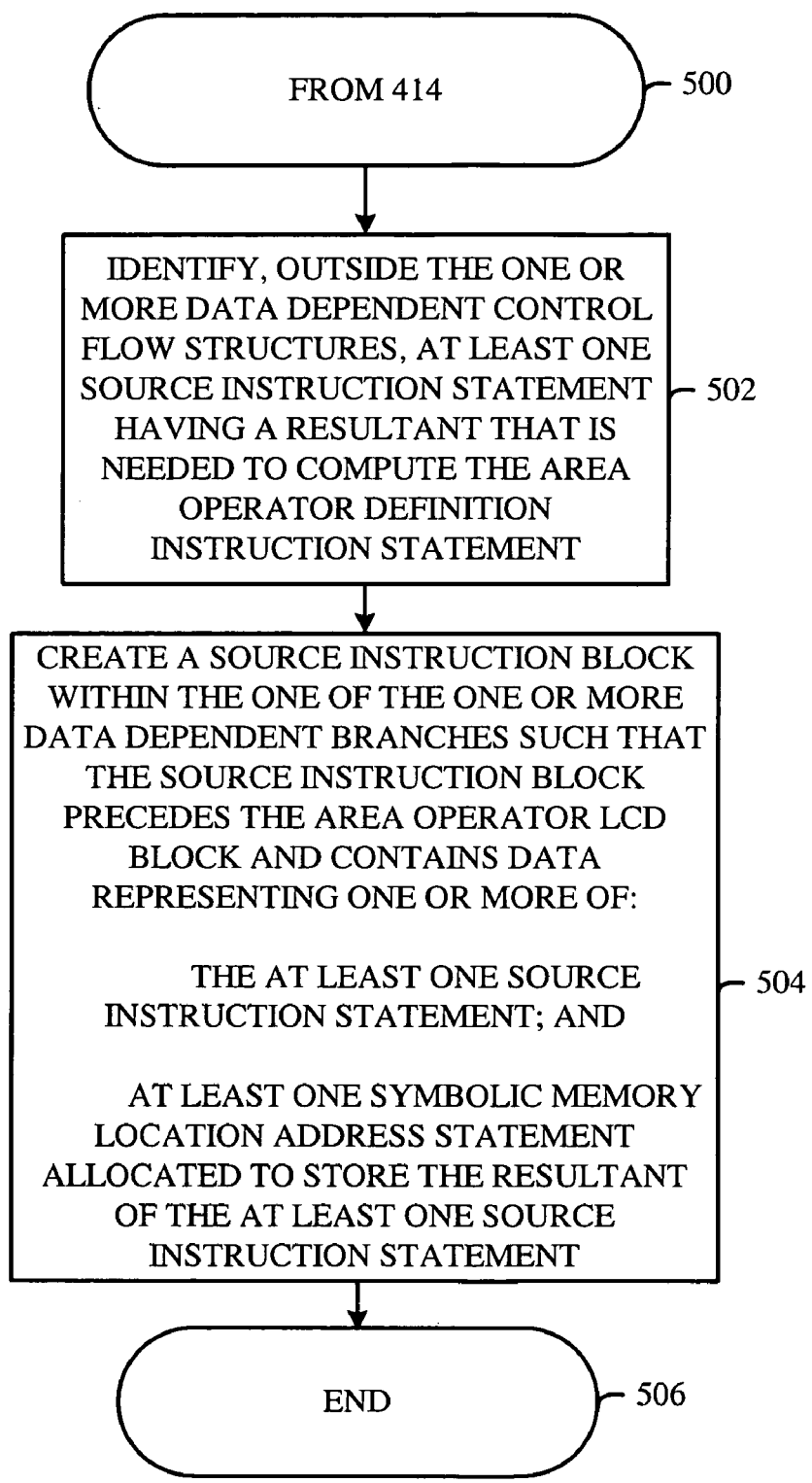
FIG. 5 is a flow chart illustrating one example of a method for creating a source instruction block within the data dependent branch of FIG. 4 in accordance with one embodiment of the present disclosure.

FIG. 5 is a flow chart illustrating one example of a method for creating a source instruction block within the data dependent branch of FIG. 4 in accordance with one embodiment of the present disclosure. As previously described, it is advantageous to include as many instruction statements as possible within data dependent control flow structures such that each instruction statement is not executed for each pixel in a grid. To this end, the method of FIG. 5 begins in block 500 where e.g., an area operator definition instruction statement is moved within the area operator LCD block. The method continues in block 502 where at least one source instruction statement is identified outside the one or more data dependent control flow structures. The identified at least one source instruction statement, in one embodiment, has a resultant that is needed to compute the area operator definition instruction statement. It is contemplated that a source instruction statement may correspond to a direct source instruction statement that has a resultant that is directly used as an operand in the area operator definition instruction statement. Additionally, it is contemplated that a source instruction may correspond to an indirect source instruction statement that has a resultant that is indirectly used as an operand in the area operator definition instruction statement. That is, the source instruction statement may provide a resultant that is used as an operand in another source instruction statement. In one embodiment, this corresponds to identifying the source instruction statement as contained in block 222 in FIG. 2.

The method continues in block 504 where a source instruction block is created within the one of the one or more data dependent branches such that the source instruction block precedes the area operator LCD block and contains data representing one or more of: the at least one source instruction statement; and at least one symbolic memory location address statement allocated to store the resultant of the at least one source instruction statement. Turning to FIG. 9, this corresponds, in one embodiment, to creating a source instruction block 904 within the data dependent branch in which the created area operator LCD block was placed. In the present example, at least one of the source instruction statement from block 232 of FIG. 2 and the symbolic memory location statement allocated to store the resultant of the source instruction statement from block 232 must be moved into the source instruction block 904. Generally, the source instruction statement itself will be moved into the source instruction block 904 unless another block, such as block 208, located before the data dependent control flow structure 220 requires the resultant of the source instruction statement. In one embodiment, the source instruction statement is not moved if the MPU 106 (i.e., the shader logic 118 of FIG. 1) does not have the ability to idle pixels that do not take the branch as described above in the background. If a source instruction is moved, the block from which it came may be deleted if no other instructions or necessary data is contained therein.

If the source instruction statement is not moved into the source instruction block 904, then, in this example where there is only one source instruction statement, the symbolic memory location statement allocated to store the resultant of the source instruction statement is added. The symbolic memory location statement may be any data representing the resultant of the source instruction statement or any other data representing the virtual address where the resultant of the source instruction statement is stored. It is contemplated that in the example where there are multiple source instruction statements, at least one of each source instruction statement or its corresponding symbolic memory location statement would be added to the source instruction block 904. Lastly, the method of FIG. 5 ends at block 506 where, e.g., the compiler may, for example, begin to insert a mirror block as described with reference to FIG. 6.

Figure 6:
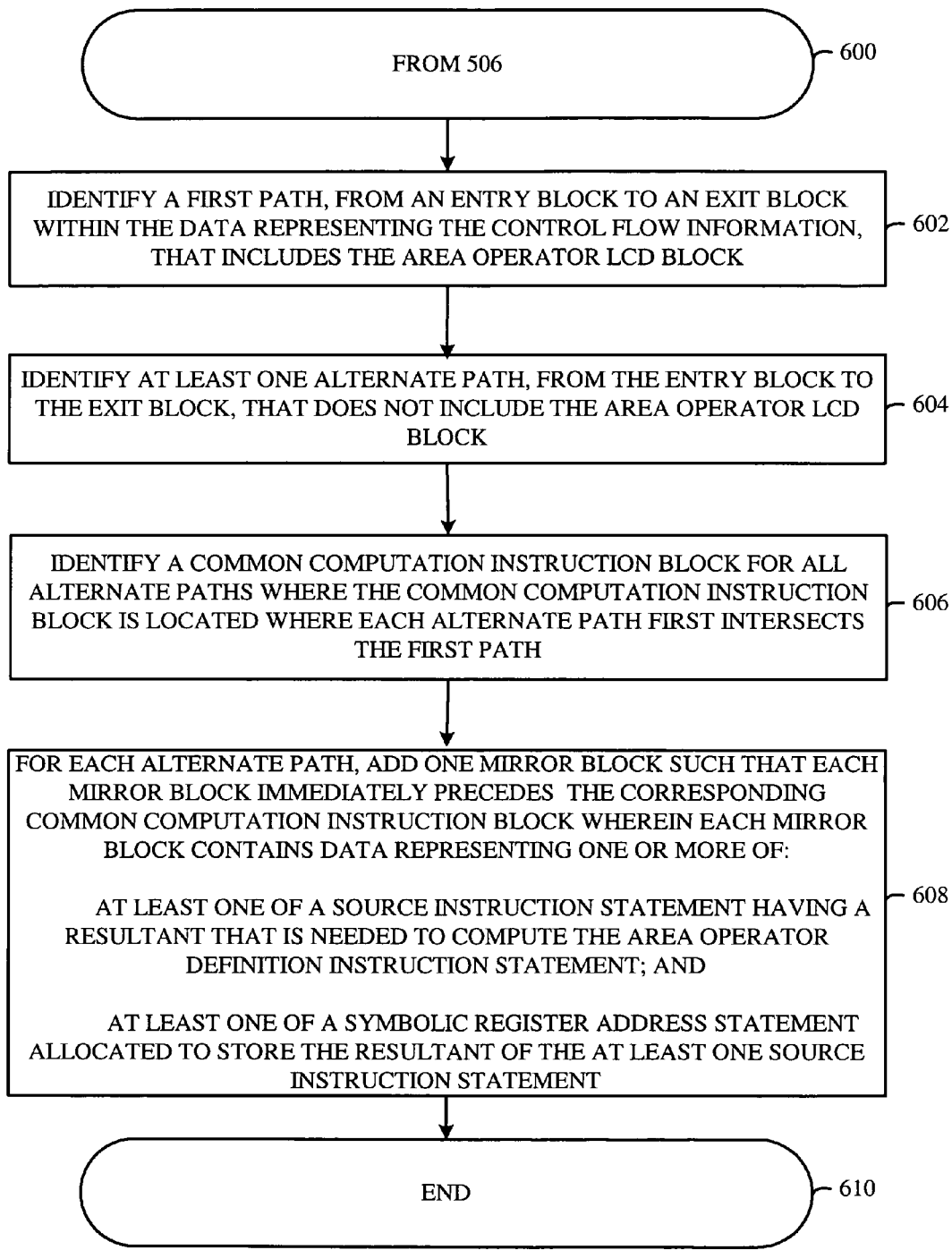
FIG. 6 is a flow chart illustrating one example of a method for creating a mirror block within the data dependent control flow structure associated with the data dependent branch of FIG. 5 in accordance with one embodiment of the present disclosure.

FIG. 6 is a flow chart illustrating one example of a method for creating a mirror block within the data dependent control flow structure associated with the data dependent branch of FIG. 5 in accordance with one embodiment of the present disclosure. As illustrated, the method may start in block 600 which may, in one embodiment, correspond to the method of block 506 of FIG. 5. The method continues in block 602 where a first path from an entry point to an exit point that includes the area operator LCD block is identified within the data representing the control flow information. In one example, this may correspond to identifying path 1 as indicated in FIG. 2. The method continues in block 604 where at least one alternate path from the entry block to the exit block is identified that does not include the area operator LCD block. In the present example, this corresponds to identifying paths 2-3 in FIG. 2. Next, in block 606, a common computation instruction block is identified for all alternate paths where the common computation instruction block is located where each alternate path intersects the first path. In FIG. 2, the common computation instruction block for path 2 and path 3 is block 228.

The method proceeds in block 608 where for each alternate path, one mirror block is added such that each mirror block immediately precedes each corresponding common computation instruction block wherein each mirror block contains data representing one or more of at least one source instruction statement having a resultant that is needed to compute the area operator definition instruction statement; and at least one of a symbolic register address statement allocated to store the resultant of the at least one source instruction statement. Thus, each mirror block contains data that represents, directly or indirectly, the source instruction statement block. In one embodiment, each mirror block contains a copy of or a pointer to the source instruction statement block. In one embodiment, this corresponds to creating mirror block 906 and mirror block 908 in FIG. 9. It is contemplated, however, that alternate paths may collapse into one alternate path requiring only one mirror block. For instance, if there were a common block joining paths 2 and 3 in FIG. 9 before the common computation instruction block 228, paths 2 and 3 would collapse into only one alternate path requiring a single mirror block. The method ends in block 610 where, in one embodiment, the method determines live memory location information.

Figure 7:
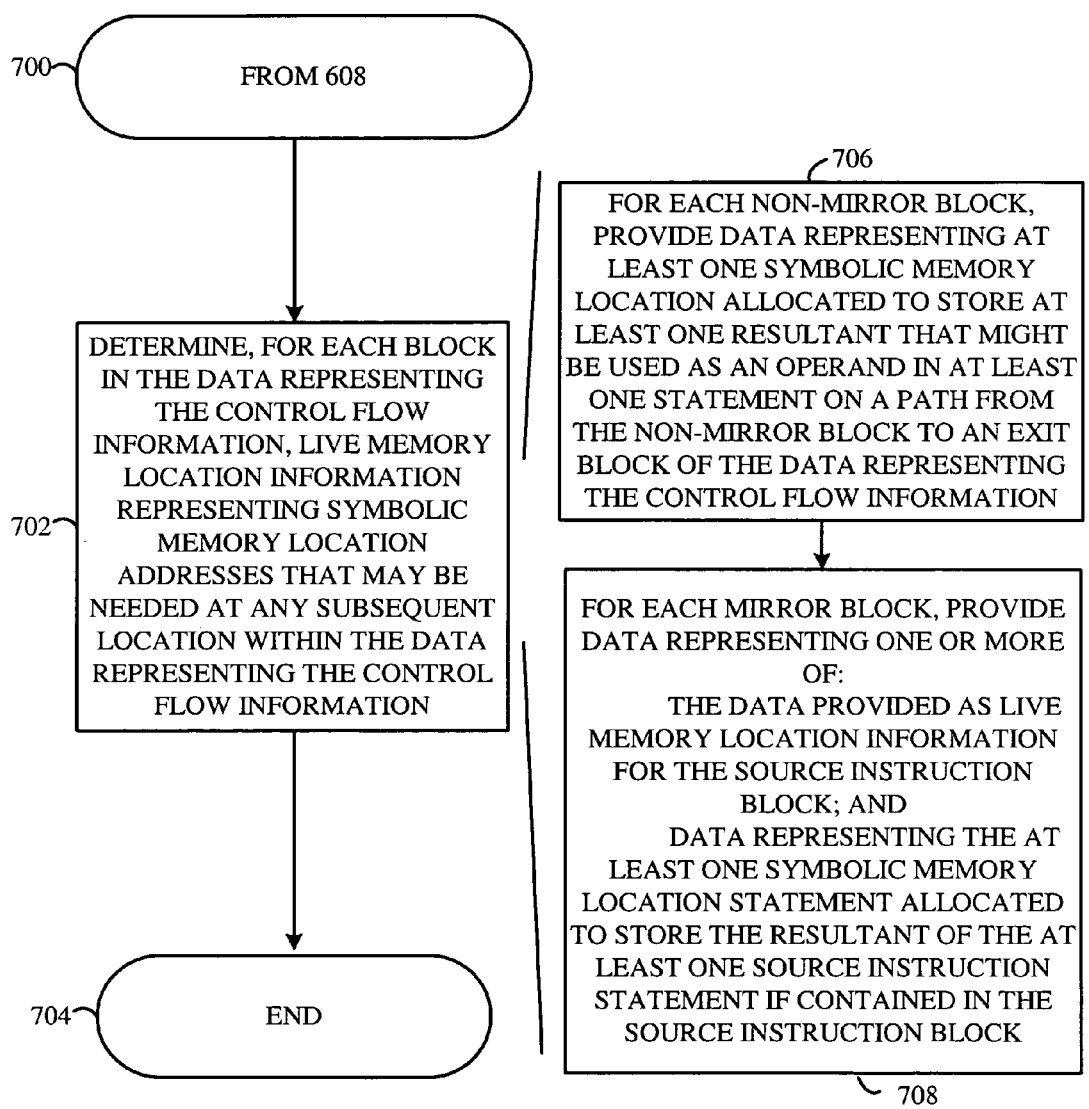
FIG. 7 is a flow chart illustrating one example of a method for generating live memory location information for each block in the data representing the control flow information in accordance with one embodiment of the present disclosure.

FIG. 7 is a flow chart illustrating one example of a method for generating live memory location information for each block in the data representing the control flow information in accordance with one embodiment of the present disclosure. The method begins in block 700 which may, in one embodiment correspond to block 608 of FIG. 6. Next, the method determines live memory location information, for each block in the data representing the control flow information, where the live memory location information represents, directly or indirectly, symbolic memory locations that may be needed at any subsequent point within the data representing the control flow information. As will be understood by those having ordinary skill in the art, determining live memory location information for each block insures that the data necessary for the successfully execution of the shader program is not written over or lost. In one embodiment, the method of block 702 is performed by following the methods of blocks 706 and 708. For example, in block 706, the live memory location information provided for each non-mirror block represents at least one symbolic (i.e., virtual) memory location allocated to store at least one resultant that might be used as an operand in at least one statement on a path from the non-mirror block to an exit block of the data representing the control flow information.

As illustrated in block 708, the live memory location information provided for each mirror block represents one or more of: the data provided as live memory location information for the source instruction block; and data representing the at least one symbolic memory location statement allocated to store the resultant of the at least one source instruction statement if contained in the source instruction block. In one embodiment, this corresponds to storing data representing, directly or indirectly, the live memory location information contained in the source instruction block 904 (e.g., by copying the data or using a pointer) and further adding to the live memory location information in each mirror block any data representing, directly or indirectly, the at least one symbolic memory location statements contained in the source instruction block 904, if any are stored therein. Lastly, the method ends in block 704 where, in one embodiment, the method begins to apply a physical memory location scheme to the data representing the control flow information.

Figure 8:
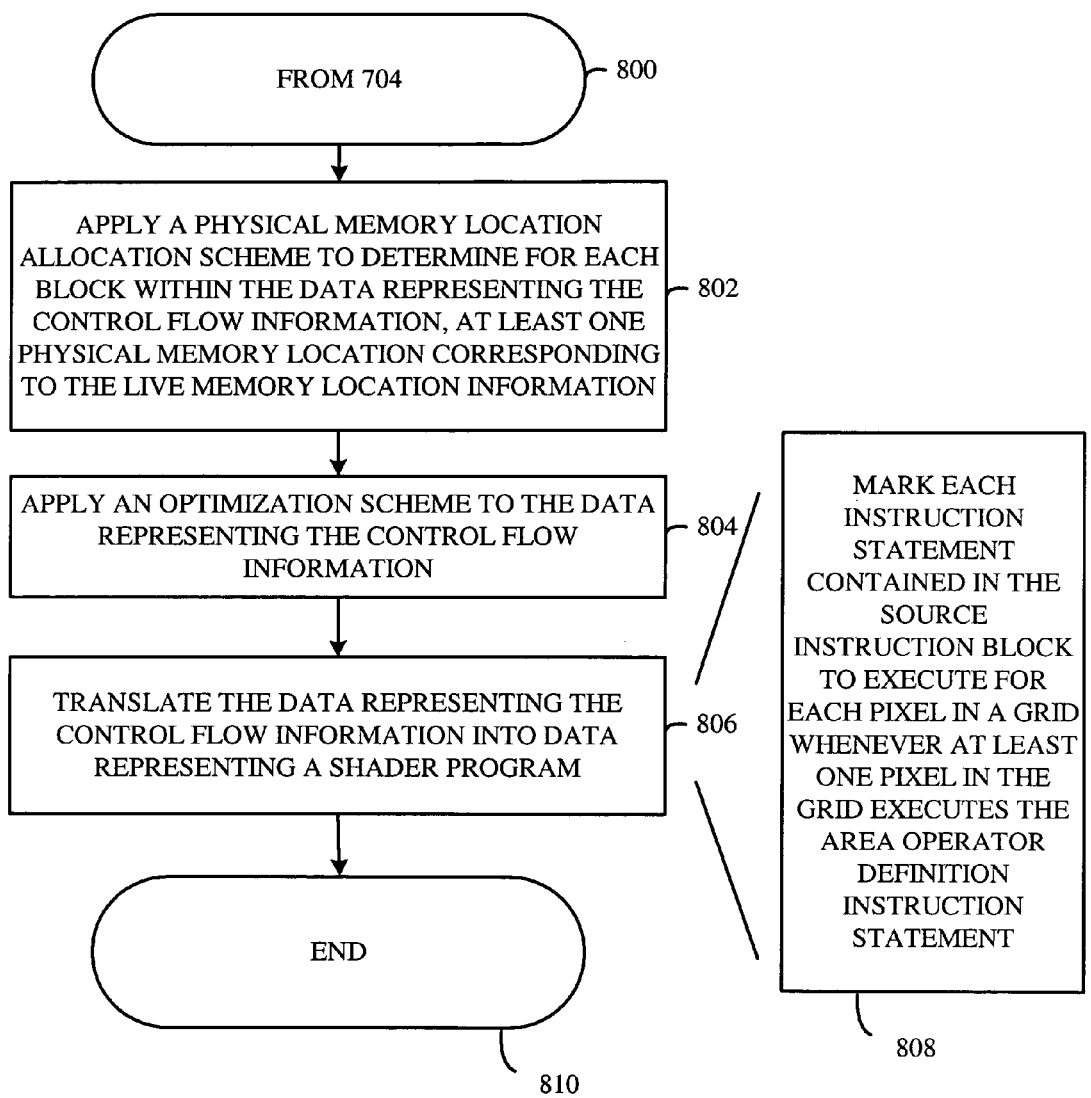
FIG. 8 is a flow chart illustrating one example of a method for translating the data representing the control flow information into data representing a shader program in accordance with one embodiment of the present disclosure.

FIG. 8 is a flow chart illustrating one example of a method for translating the data representing the control flow information into data representing a shader program in accordance with one embodiment of the present disclosure. The method begins in block 800 which, in one embodiment, corresponds to block 704 of FIG. 7. The method continues in block 802 where a physical memory location allocation scheme is applied to determine at least one physical memory location corresponding to the live memory location information for each block within the data representing the control flow information. The method continues in block 804 where an optimization scheme is applied to the data representing the control flow information. In block 806 the data representing the control flow information is translated into data representing a shader program. In one embodiment, the method of block 806 includes the method of block 808 where each instruction statement contained in the source instruction block is marked, e.g., with any suitable indicator or flag, to execute for each pixel in a grid whenever at least one pixel in the grid executes the area operator definition instruction statement. That is, each instruction statement contained in each source instruction statement block is marked to execute for all pixels including idle pixels in a grid where the idle pixels are defined as those that will not execute the area operator definition instruction statement. Lastly, the method ends in block 810. One benefit of the present disclosure is the ability to modify the data representing the control flow information as described above with reference to FIGS. 4-7 while still applying stock compiler schemes such as the physical memory location allocation scheme, the optimization scheme and the translation scheme provided above in FIG. 8. Thereafter, the data representing the shader program may be further modified, stored in any suitable memory or executed by the graphics processor.

As illustrated in FIG. 9, the methods of FIGS. 4-7 provide a method of bringing area operator definition instruction statements and related source instruction statements into the data representing control flow information in a manner that prohibits other statements in the control flow information from writing over necessary memory locations (virtual or physical) needed to compute area operator definition instruction statements and area operator use instruction statements. This is accomplished by, among other things, the creation and population of a source instruction block and one or more mirror blocks.

Figure 10:
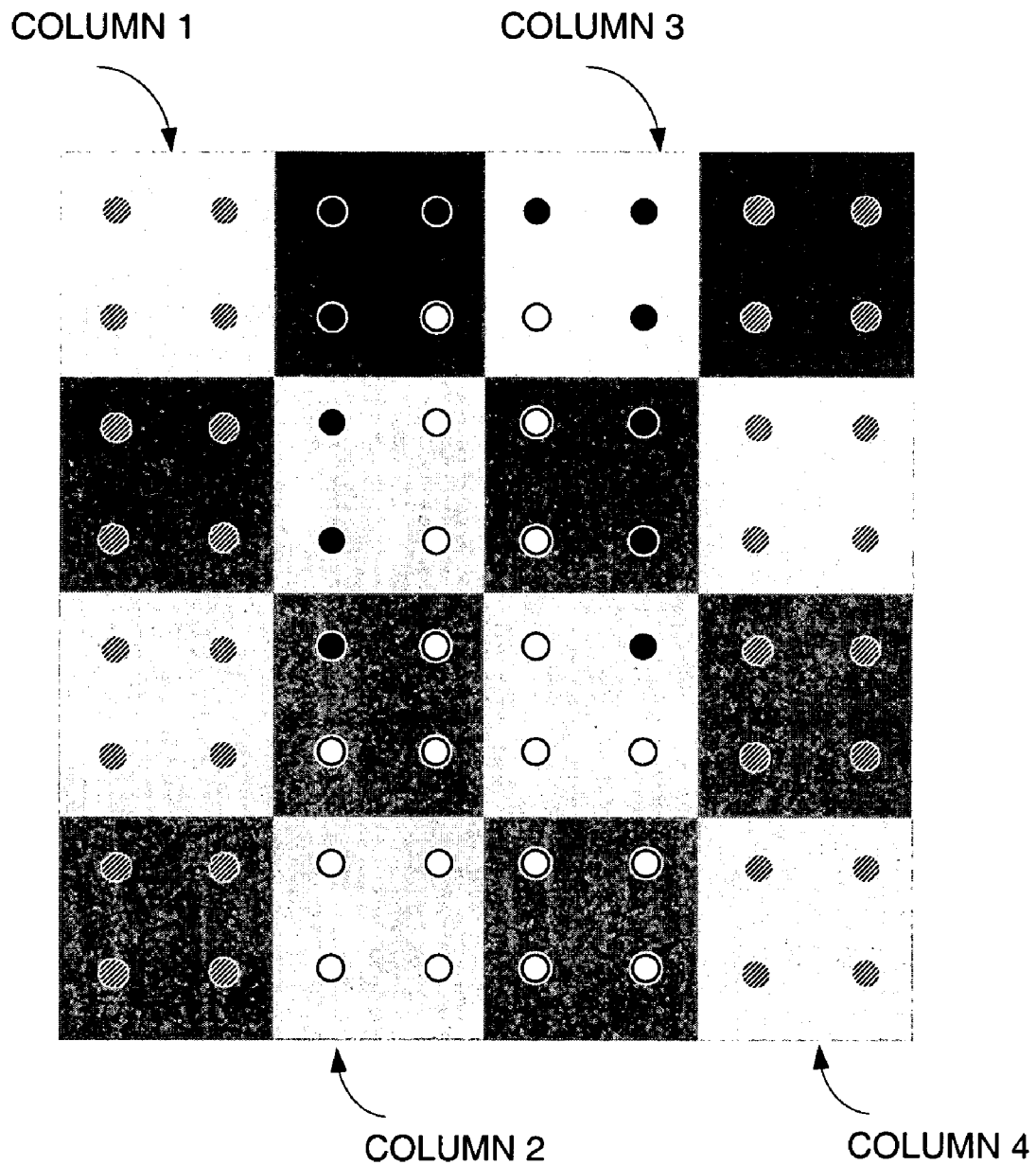
FIG. 10 is a block diagram of the plurality of pixels of FIG. 3 further illustrating which quads do not execute the area operator definition instruction statement after the compiler has modified the data representing the control flow information using the methods of FIGS. 4-7 in accordance with one embodiment of the present disclosure.

FIG. 10 is a block diagram of a plurality of pixels 300 further illustrating which pixels do not execute the area operator definition instruction statement after the compiler has modified the data representing the control flow information using the methods of FIGS. 4-7 in accordance with one embodiment of the present disclosure. With reference to FIGS. 2 and 9, after the area operator definition instruction statement (originally contained within block 230) is moved within data dependent control flow structure 220 as indicated by block 902, several of the quads no longer need to process the area operator definition instruction statement. These quads correspond to those quads in column 1 and column 4 in FIG. 10 containing only stripped pixels. One of ordinary skill in the art will recognize that each pixel in these quads receives a "false" result at decisional block 224 and thus does not need to execute the area operator definition instruction statement in any situation. Because other quads in the plurality of pixels 1000 contain at least one pixel that receives a "true" result at decisional block 224, the area operator instruction statement operates on each pixel in the remaining quads (i.e., columns 2 and 3).

Thus, a method and apparatus has been described that provides a viable and robust solution to the needs addressed above. Specifically, by automatically moving the area operator definition instruction statement into the data dependent control flow structure without program developer intervention, the compiler is able to generate a shader program that executes substantially faster and with less resources that prior art alternatives. That is the source code for the shader program can be written in two parts, as discussed above, without any modifications by the program developer. Improved performance is also provided when source instructions are automatically moved inside the corresponding data dependent control flow structures. By maintaining live memory location information at any given point in the shader program, (e.g., a list of virtual memory addresses) the method and apparatus successfully allocates physical memory addresses (e.g., registers) for use during program execution.

The above detailed description of the invention and the examples described therein have been presented for the purposes of illustration and description only and not by limitation. It is therefore contemplated that the present invention cover any and all modifications, variations, or equivalents that fall in the spirit and scope of the basic underlying principles disclosed above and claimed herein. For example, the above methods may be implemented in any SIMD or MIMD (multiple instruction, multiple data) machine or processor whether implemented in hardware or software (e.g., using an emulation technique) that uses the equivalent of area operators and is not limited to shader programs or graphics processing.

In another embodiment, it is contemplated that the overall methods described above with reference to FIGS. 4-7 are repeatedly performed for multiple area operator definition instruction statements thereby achieving greater efficiencies for each area operator definition instruction statement moved within the data dependent control flow structures.

Alternatively, it is contemplated that the method provided above may be provided in a recursive manner on subsets of the area operator use instruction statements. That is, for a given subset of area operator use instruction statements, the area operator LCD block corresponding to the subset may be identified. A copy of the area operator definition instruction statement may be place therein and corresponding source instruction and mirror blocks may be provided in the same manner as provided above. The same procedure may then be applied to another subset of area operator use instruction statements until there are no more area operator use instruction statements corresponding to the particular area operator definition instruction statement. At that point, the area operator definition instruction statement may be deleted from its original position outside the data dependent control flow structure. While this recursive solution provides an alternate approach, it requires multiple copies of the area operator definition instruction statement any may only be practical where it is determined that the statements in one or more branches are frequently executed by pixel data for the application.

What is claimed is:

1. A method of comprising:
    using one or more processors for:
    identifying, within data representing control flow information that includes one or more blocks of statements and one or more data dependent control flow structures each including one or more data dependent branches each branch including one or more blocks of statements, an area operator definition instruction statement located outside the one or more data dependent control flow structures where the area operator definition instruction statement includes a resultant and at least one operand;

identifying, within one of the one or more data dependent branches, at least one area operator use instruction statement having the resultant of the area operator definition instruction statement as an operand; and moving the area operator definition instruction statement within the data dependent branch.

2. The method of claim 1 wherein moving the area operator definition instruction statement within the data dependent branch comprises:

identifying, within the one or more data dependent branches, an area operator least common dominator ("LCD") block representative of the least common dominator of all area operator use instruction statements; and moving the area operator definition instruction statement within the area operator LCD block.

3. The method of claim 2 further comprising:

identifying, outside the one or more data dependent control flow structures, at least one source instruction statement having a resultant that is needed to compute the area operator definition instruction statement; and creating a source instruction block within the one of the one or more data dependent branches such that the source instruction block precedes the area operator LCD block and contains data representing one or more of:

the at least one source instruction statement; and at least one symbolic memory location statement allocated to store the resultant of the at least one source instruction statement.

4. The method of claim 3 further comprising:

identifying a first path, from an entry block to an exit block within the data representing the control flow information, that includes the area operator LCD block;

identifying at least one alternate path, from the entry block to the exit block, that does not include the area operator LCD block;

identifying a common computation instruction block for all alternate paths where the common computation instruction block is located where each alternate path first intersects the first path; and for each alternate path, adding one mirror block such that each mirror block immediately precedes the corresponding common computation instruction block wherein each mirror block contains data representing one or more of:

at least one of a source instruction statement having a resultant that is needed to compute the area operator definition instruction statement; and at least one of a symbolic memory location statement allocated to store the resultant of the source instruction statement.

5. The method of claim 4 further comprising determining, for each block in the data representing the control flow information, live memory location information representing symbolic memory locations that may be needed at any subsequent point within the data representing the control flow information.

6. The method of claim 5, wherein determining live memory location information for each block comprises:

for each non-mirror block, providing data representing at least one symbolic memory location allocated to store at least one resultant that might be used as an operand in at least one statement on a path from the non-mirror block to an exit block of the data representing the control flow information; and for each mirror block, providing data representing one or more of:

data provided as live memory location information for the source instruction block; and data representing the at least one symbolic memory location statement allocated to store the resultant of the at least one source instruction statement if contained in the source instruction block.

7. The method of claim 5 further comprising at least one of:

applying a physical memory location allocation scheme to determine for each block within the data representing the control flow information, at least one physical memory location corresponding to the live memory location information; and applying an optimization scheme to the data representing the control flow information.

8. The method of claim 5 further comprising translating the data representing the control flow information into data representing a shader program.

9. The method of claim 8, wherein translating the data representing the control flow information into data representing the shader program comprises marking each instruction statement contained in the source instruction block to execute for each pixel in a grid whenever at least one pixel in the grid executes the area operator definition instruction statement.

10. The method of claim 1 further comprising, prior to identifying the area operator definition instruction statement, generating the data representing the control flow information based on received data representing application code.

11. A memory comprising stored instructions such that when executed, cause at least one of the one or more processors to:

identify, within data representing control flow information that includes one or more blocks of statements and one or more data dependent control flow structures each including one or more data dependent branches each branch including one or more blocks of statements, an area operator definition instruction statement located outside the one or more data dependent control flow structures where the area operator definition instruction statement includes a resultant and at least one operand;

identify, within one of the one or more data dependent branches, at least one area operator use instruction statement having the resultant of the area operator definition instruction statement as an operand; and move the area operator definition instruction statement within the data dependent branch.

12. The memory of claim 11, wherein the stored instructions that cause the at least one of the one or more processors to move the area operator definition instruction statement within the data dependent branch further cause at least one of the one or more processors to:

identify, within the one or more data dependent branches, an area operator least common dominator ("LCD") block representative of the least common dominator of all area operator use instruction statements; and move the area operator definition instruction statement within the area operator LCD block.

13. The memory of claim 12, wherein the memory further comprises stored instructions such that when executed, cause at least one of the one or more processors to:

identify, outside the one or more data dependent control flow structures, at least one source instruction statement having a resultant that is needed to compute the area operator definition instruction statement; and create a source instruction block within one of the one or more data dependent branches such that the source instruction block precedes the area operator LCD block and contains data representing one or more of:

the at least one source instruction statement; and at least one symbolic memory location statement allocated to store the resultant of the at least one source instruction statement.

14. The memory of claim 13, wherein the memory further comprises stored instructions such that when executed, cause at least one of the one or more processors to:

identify a first path, from an entry block to an exit block within the data representing the control flow information, that includes the area operator LCD block;

identify at least one alternate path, from the entry block to the exit block, that does not include the area operator LCD block;

identify a common computation instruction block for all alternate paths where the common computation instruction block is located where each alternate path first intersects the first path; and for each alternate path, add one mirror block such that each mirror block immediately precedes the corresponding common computation instruction block wherein each mirror block contains data representing one or more of:

at least one of a source instruction statement having a resultant that is needed to compute the area operator definition instruction statement; and at least one of a symbolic memory location statement allocated to store the resultant of the source instruction statement.

15. The method of claim 14, wherein the memory further comprises stored instructions such that when executed, cause at least one of the one or more processors to:

determine, for each block in the data representing the control flow information, live memory location information representing symbolic memory locations that may be needed at any subsequent point within the data representing the control flow information;

wherein, for each non-mirror block, the live memory location information corresponds to data representing at least one symbolic memory location allocated to store at least one resultant that might be used as an operand in at least one statement on a path from the non-mirror block to an exit block of the data representing the control flow information; and wherein, for each mirror block, the live memory location information corresponds to one or more of:

data provided as live memory location information for the source instruction block; and data representing the at least one symbolic memory location statement allocated to store the resultant of the at least one source instruction statement if contained in the source instruction block.

16. The memory of claim 15, wherein the memory further comprises stored instructions such that when executed, cause at least one of the one or more processors to:

translate the data representing the control flow information into data representing a shader program; and wherein translating the data representing the control flow information into data representing the shader program includes marking each instruction statement contained in the source instruction block to execute for each pixel in a grid whenever at least one pixel in the grid executes the area operator definition instruction statement.

17. An apparatus comprising:

one or more processors coupled to memory that contains stored instructions such that when executed by at least one of the one or more processors, cause at least one of the one or more processors to:

identify, within data representing control flow information that includes one or more blocks of statements and one or more data dependent control flow structures each including one or more data dependent branches each branch including one or more blocks of statements, an area operator definition instruction statement located outside the one or more data dependent control flow structures where the area operator definition instruction statement includes a resultant and at least one operand;

identify, within one of the one or more data dependent branches, at least one area operator use instruction statement having the resultant of the area operator definition instruction statement as an operand; and move the area operator definition instruction statement within the data dependent branch.

18. The apparatus of claim 17, wherein the stored instructions that cause the at least one of the one or more processors to move the area operator definition instruction statement within the data dependent branch further cause at least one of the one or more processors to:

identify, within the one or more data dependent branches, an area operator least common dominator ("LCD") block representative of the least common dominator of all area operator use instruction statements; and move the area operator definition instruction statement within the area operator LCD block.

19. The apparatus of claim 18, wherein the memory further comprises stored instructions such that when executed, cause at lest one of the one or more processors to:

identify, outside the one or more data dependent control flow structures, at least one source instruction statement having a resultant that is needed to compute the area operator definition instruction statement; and create a source instruction block within the one of the one or more data dependent branches such that the source instruction block precedes the area operator LCD block and contains data representing one or more of:

the at least one source instruction statement; and at least one symbolic memory location statement allocated to store the resultant of the at least one source instruction statement.

20. The apparatus of claim 19, wherein the memory further comprises stored instructions such that when executed, cause at least one of the one or more processors to:

identify a first path, from an entry block to an exit block within the data representing the control flow information, that includes the area operator LCD block;

identify at least one alternate path, from the entry block to the exit block, that does not include the area operator LCD block;

identify a common computation instruction block for all alternate paths where the common computation instruction block is located where each alternate path first intersects the first path; and for each alternate path, add one mirror block such that each mirror block immediately precedes the corresponding common computation instruction block wherein each mirror block contains data representing one or more of:

at least one of a source instruction statement having a resultant that is needed to compute the area operator definition instruction statement; and at least one of a symbolic memory location statement allocated to store the resultant of the source instruction statement.

21. The apparatus of claim 20, wherein the memory further comprises stored instructions such that when executed, cause at least one of the one or more processors to:
   determine, for each block in the data representing the control flow information, live memory location information representing symbolic memory locations that may be needed at any subsequent point within the data representing the control flow information;
   wherein, for each non-mirror block, the live memory location information corresponds to data representing at least one symbolic memory location allocated to store at least one resultant that might be used as an operand in at least one statement on a path from the non-mirror block to an exit block of the data representing the control flow information; and
   wherein, for each mirror block, the live memory location information corresponds to one or more of:
   data provided as live memory location information for the source instruction block; and
   data representing the at least one symbolic memory location statement allocated to store the resultant of the at least one source instruction statement if contained in the source instruction block.

22. The apparatus of claim 17, wherein the memory further comprises stored instructions such that when executed, cause at least one of the one or more processors to provide at least one shading operation on a plurality of pixels based on the control flow information.

23. The apparatus of claim 17, wherein the memory further comprises stored instructions such that when executed, cause at least one of the one or more processors to:
   translate the data representing the control flow information into data representing a shader program; and
   wherein translating the data representing the control flow information into data representing the shader program includes marking each instruction statement contained in the source instruction block to execute for each pixel in a grid whenever at least one pixel in the grid executes the area operator definition instruction statement.

* * * * *